United States Patent [19]

Green et al.

[11] 4,173,700

[45] Nov. 6, 1979

[54] BIS (DIFLUOROMALEIMIDE) CAPPED PROPOLYMERS AND POLYMERS

[75] Inventors: Howard E. Green, Seal Beach; Robert J. Jones, Hermosa Beach; Michael K. O'Rell, Manhattan Beach, all of Calif.

[73] Assignee: TRW Inc., Cleveland, Ohio

[21] Appl. No.: 917,602

[22] Filed: Jun. 21, 1978

[51] Int. Cl.$^2$ .............................................. C08G 73/10
[52] U.S. Cl. .............................. 528/125; 260/326.26; 260/326 N; 260/326 S; 260/326 C; 528/172; 528/173; 528/342; 528/352; 528/353
[58] Field of Search .......... 260/326.26, 326 N, 326 S, 260/326 C; 528/172, 173, 125, 342, 352, 353

[56] References Cited

U.S. PATENT DOCUMENTS

| | | | |
|---|---|---|---|
| 2,980,694 | 4/1961 | Sauers et al. | 260/326.26 |
| 3,234,181 | 2/1966 | Olivier | 528/353 |
| 3,761,453 | 9/1973 | Jones | 528/363 |
| 3,792,022 | 2/1974 | Jones | 528/46 |
| 3,998,904 | 12/1976 | Balme et al. | 260/830 R |
| 4,046,777 | 9/1977 | Muller | 260/326.26 |
| 4,060,515 | 11/1977 | D'Alelio | 528/353 |

FOREIGN PATENT DOCUMENTS

| | | | |
|---|---|---|---|
| 47-14745 | 2/1972 | Japan | 260/326.26 |
| 47-14747 | 2/1972 | Japan | 260/326.26 |

*Primary Examiner*—Ronald W. Griffin
*Attorney, Agent, or Firm*—John J. Connors; D. R. Nyhagen; R. W. Keller

[57] ABSTRACT

End-capping an aromatic diamine or a precursor formed by reaction of an aromatic diamine with an aromatic dianhydride with difluoromaleic anhydride yields prepolymers which thermally cure at temperatures from about 150° to about 200° C. to form polymers which display long-term thermal stability at temperatures up to 300° C. and more.

8 Claims, No Drawings

BIS (DIFLUOROMALEIMIDE) CAPPED PROPOLYMERS AND POLYMERS

BACKGROUND OF THE INVENTION

A need has existed for materials which can be cured at temperatures below about 200° C. to yield thermoxidatively stable, structural resins which display long-term stability at temperatures of 300° C. or more. This need exists because of the limitations of processing equipment for fabrication of large forms at elevated temperatures and pressures. The need for greater reduced costs and energy consumption have also been strong motivating factors in the search for high performance resins with increased processability.

The present invention is directed to a family of prepolymers and polymers formed therefrom which satisfy these needs.

SUMMARY OF THE INVENTION

According to the invention there is provided prepolymers of the formula:

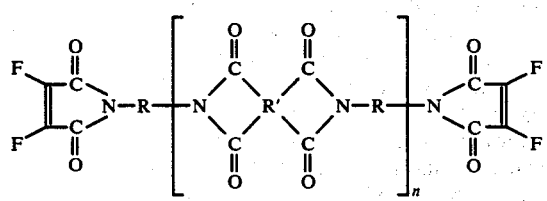

wherein n has a value of 0 to about 3, each R is independently an aromatic radical, and R' is a tetra functional radical and selected from the group consisting of:

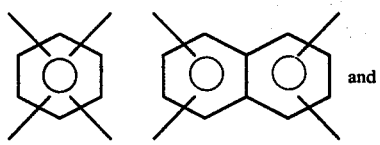
and wherein R" is a difunctional radical selected from the group consisting of $-SO_2-$, $-O-$, $-S-$, $-CO-$,

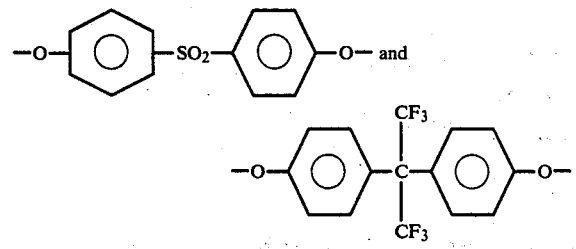

The prepolymers may be formed by a condensation reaction of difluoromaleic anhydride with an aromatic diamine precursor which is preferably in turn the condensation product of about two moles of an aromatic diamine with about one mole of an aromatic dianhydride.

The difluoromaleic anhydride end-capped prepolymers thermally cure at temperatures from about 150° to about 200° C. to yield cured products which display long-term stability on exposure to temperatures of 300° C. or more.

According to our invention, there is also provided the polymers made by thermally curing the above described prepolymer.

DETAILED DESCRIPTION

Thermally curable bis(difluoromaleimide)-capped prepolymers of this invention are of the formula:

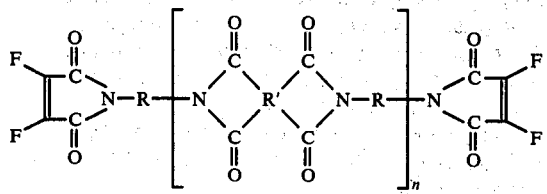

wherein n has a value from 0 to about 3, each R is independently an aromatic radical of an aromatic diamine, and R' a tetra functional radical of an aromatic dianhydride selected from the group consisting of:

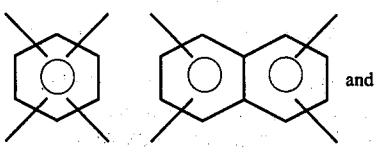
and wherein R" is a difunctional radical selected from the group consisting of $-SO_2-$, $-O-$, $-S-$, $-CO-$, $-O-\bigcirc-SO_2-\bigcirc-O-$ and $-O-\bigcirc-\underset{\underset{CF_3}{|}}{\overset{\overset{CF_3}{|}}{C}}-\bigcirc-O-$ The aromatic diamines used are thermally stable aromatic diamines. Among the utile aromatic diamines there may be mentioned:
bis-2,2-[4-(4-aminophenoxy)phenyl]hexafluoropropane,
meta-phenylene diamine,
4,4'-diamino-diphenyl propane,
4,4'-diamino-diphenyl methane,
4,4'-diamino-diphenyl sulfide,
4,4'-diamino-diphenyl sulfone,
3,3'-diamino-diphenyl sulfone,
4,4'-diamino-diphenyl ether,
1,5-diamino-naphthalene, 2,4-bis-(beta-amino-t-butyl)toluene,
bis-(para-beta-amino-t-butyl-phenyl)ether,
bis-(para-beta-methyl-delta-amino-pentyl)benzene,
bis-para-(1,1-dimethyl-5-amino-pentyl)benzene,
and the like.

Bis-2,2-[4-(4-aminophenoxy)phenyl]hexafluoropropane and 4,4'-diamino-diphenyl methane are presently preferred.

The useful aromatic dianhydrides are selected for thermal stability and to add processability, namely, to impart meltflow characteristics to the prepolymer prior to cure through the difluoromaleic group. Among the utile dianhydrides there may be mentioned:
pyromellitic dianhydride,
benzophenone tetracarboxylic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl)propane dianhydride,
3,4,9,10-perylene tetracarboxylic dianhydride,
bis-2,2-[4-(3,4-dicarboxyphenoxy)phenyl]-hexafluoropropane dianydride,
bis(3,4-dicarboxyphenyl)ether dianhydride,
naphthalene-1,2,4,5-tetracarboxylic dianhydride,
naphthalene-1,4,5,8-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,8,9,10-tetracarboxylic dianhydride,
pyrazine-2,3,5,6-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(3,4-dicarboxyphenyl)sulfone dianhydride,
benzene-1,2,3,4-tetracarboxylic dianhydride,
thiophene-2,3,4,5-tetracarboxylic dianhydride,
bis(3,4-dicarboxyphenoxyphenyl)sulfone dianhydride and the like.

Bis-2,2-[4-(3,4-dicarboxylphenoxy)phenyl]-hexafluoropropane dianhydride is presently preferred.

The prepolymers are conveniently prepared by condensation reactions. If a dianhydride is to be included in the backbone, the first step involves condensation of the diamine with the dianhydride. The molar ratio of diamine to dianhydride must be sufficient to provide a terminal amino group at the ends of the reaction product for difluoromaleic anhydride end-capping purposes. Generally, the molar ratios of diamine to dianhydride will range from 2 to 1 to 4 to 3. The initial addition reaction may be carried out at temperatures from 120° to 150° C. in a suitable solvent such as xylene, toluene, and other high boiling aromatic solvents. The reaction product is normally recovered for subsequent addition of difluoromaleic anhydride.

Whether the reaction is with an aromatic diamine alone or the reaction product of an aromatic diamine and an aromatic diahydride, end-capping also occurs by a condensation reaction but at lower temperatures. Typically, difluoromaleic anhydride is added at temperatures from about 50° to about 100° C. in suitable solvent, preferably in the presence of an otherwise nonreactive agent which will take up the split-off water. Such agents include acetic anhydride, phosphorous pentoxide, and the like. Their use tends to promote the condensation reaction. The reaction is typically carried out in a mutual solvent such as toluene, dimethylformamide and the like.

A schematic route for prepolymer formation based on 4,4'diamino-diphenyl methane (MDA) and bis-2,2-[4-(3,4dicarboxyphenoxy)phenyl]-hexafluropropane dianhydride is depicted below.

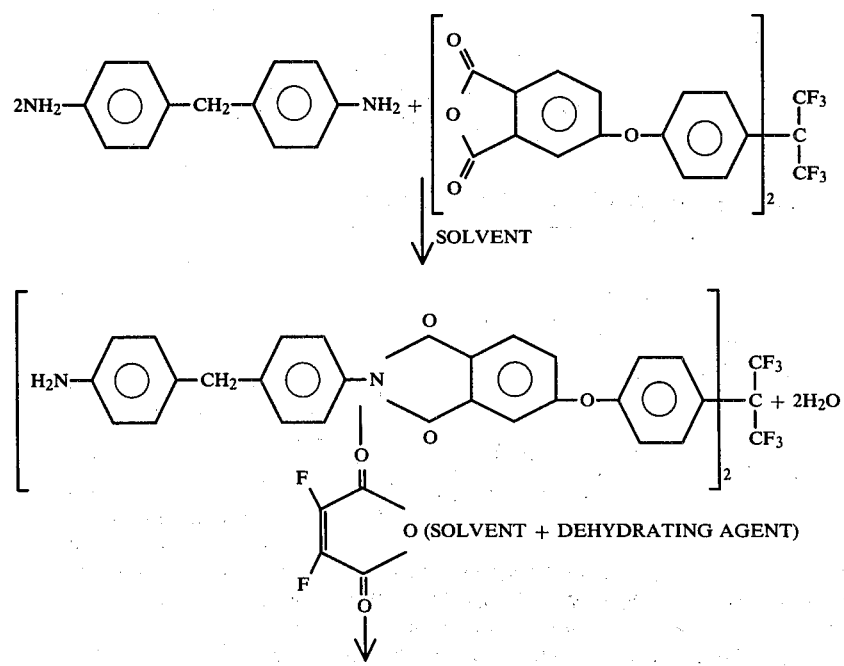

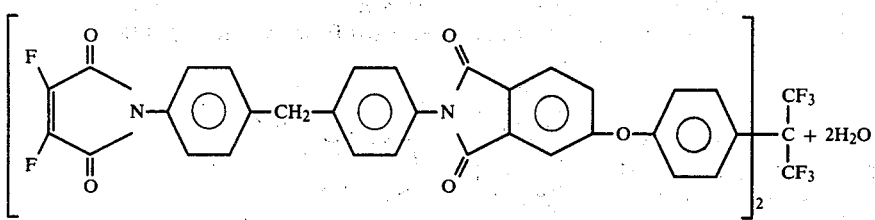

One or more prepolymers formed in accordance with the instant invention may be thermally cured at temperatures from about 150° to about 200° C., more typically from about 190° to about 200° C. While not bound by theory, cure is believed to be by a free radical mechanism through the vinyl unsaturation in the difluoromaleimide groups.

They are utile in the preparation of molded products, the forming of composite and adhesive bonded structures and in coating applications. Where it is desired to apply the prepolymers to a substrate in a solvent prior to cure, they may be dissolved in cyclic ethers such as tetrahydrofuran, dioxane and the like; acetone; as well as aprotic solvents such as dimethyl formamide, dimethyl acetamide and the like.

A unique property of the prepolymers is the ability of the prepolymer to melt-flow prior to cure. This enables complete filling of mold cavities and the like and the wetting of substrates such as fibers or surfaces of a laminate before cure is perfected.

Upon cure, the end products display continuous service at prolonged exposure at temperatures up to about 300° C. or more. By contrast, the prepolymers, if end-capped with maleic anhydride, would have an upper limit of continuous thermal stability of only about 230° C. End-capping with other halogenated maleic anhydrides would materially increase cure temperature.

While nowise limiting, the following examples are illustrative of the invention.

EXAMPLE 1

Preparation of Precursor of Prepolymer from MDA and BFDA

In a 100 ml round-bottomed flask, equipped with a magnetic stirring apparatus, a reflux condenser attached to a Dean-Stark trap and an oil bath, there was added 15.70 g (0.025 mole) of bis-2,2-[4-(3,4-dicarboxyphenoxy)phenyl]-hexafluoropropane dianhydride (BFDA) to a contained solution of 10.90 g (0.055 mole) of methylene dianiline (MDA) in a mixture of 50 ml xylene and 5 ml dimethylformamide. The solution was heated to reflux for 24 hours at about 135° C. The water formed and released was removed with the Dean-Stark trap. The resulting diamine was isolated by stripping off the solvent at a reduced pressure to yield 24.3 g (99% yield) of a reactive addition product having a melting point of 90°–100° C.

EXAMPLE 2

Difluoromaleic Anhydride End-Capping

To a three-necked flask fitted with a magnetic stirrer and maintained under a nitrogen atmosphere, there was added 4.95 g (0.005 mole) of the reaction product of Example 1 to 1.48 g (0.011 mole) of difluoromaleic anhydride in a contained mixture 40 ml toluene and 5 ml dimethylformamide. After 20 minutes of stirring, 3.30 g of acetic anhydride and 0.25 g (p.003 mole) of sodium acetate was added and the mixture stirred for an additional 60 minutes. The reaction mixture was heated to 50° C. for 16 hours before pouring into 500 ml of ethanol. The resulting precipitate was collected by filtration and washed with ethanol and water. The product was dried for 24 hours under vacuum at 60° C. The reaction product weighed 4.85 g for a yield of 89.3%. It had a melting point between 170° and 173° C. as measured in a Fisher-Johns apparatus.

The product had as the principal component the compound of the structure:

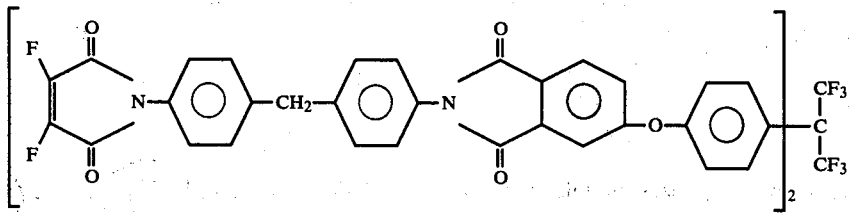

When subject to Differential Scanning Calorimetry (DSC) analysis in air, the material displayed a melting point endotherm of approximately 175° C. Cure of the prepolymer can be initiated between 190° and 200° C. When thermally cured, the resin was found to have a major decomposition temperature in air of about 520° C. as measured by Thermal Gravimetric Analysis (TGA).

EXAMPLE 3

Using the procedure of Examples 1 and 2, there was formed a difluoromaleic anhydride end-capped prepolymer by the condensation reaction of meta-phenylene diamine (MPD) with BFDA. The principal component of the product formed had the structure:

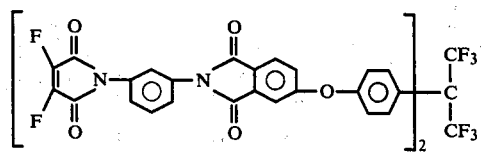

The composition recovered had a melting point of approximately 200° C. (DSC) and cured at about 138° C. The TGA decomposition temperature in air was found to be approximately 480° C.

EXAMPLE 4

To a 100-ml round-bottomed flask equipped with a magnetic stirrer, condenser and Dean-Stark trap there is added 2.07 g (0.004 mole) of 2,2-bis[4-(4-aminophenoxy)phenyl] hexafluoropropane (BDAF), 50 ml of toluene and 5 ml of dimethylformamide (DMF). To this solution there is added 1.26 g (0.002 mole) of 2,2-bis[4-(3,4-dicarboxyphenoxy) phenyl] hexafluoropropane dianhydride (BFDA). The solution is heated at reflux for 16 hours during which time the water from imidization is removed. The mixture is allowed to cool to room temperature and then 0.268 g (0.002 mole) of difluoromaleic anhydride is added and 30 minutes later 3.3 g of acetic anhydride and 0.25 g of sodium acetate are added to the reaction flask. The mixture is heated at 50° C. for 16 hours and then added to 300 ml of ethanol. The resulting precipitate was collected by filtration and washed with an ethanol/water (1:1 by volume) mixture. The main constituent of the product is a prepolymer of the formula:

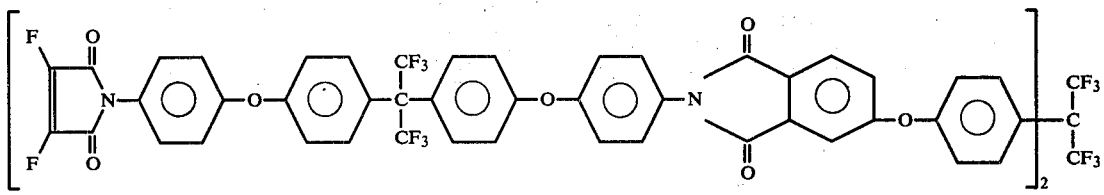

The product is heat curable to furnish a heat stable resin.

EXAMPLE 5

A 2.0 g sample of the prepolymer prepared in Example 2 is cured by heating the sample from 50° C. to 200° C. over a 30 min. period followed by continued heating at 200° C. for about 2 hours. The resultant polymer is a consolidated glassy substance that is thermally stable in air to 320° C. as assessed by thermal gravimetric analysis. The polymer is completely insoluble in boiling dimethyl formamide demonstrating a high degree of the desired crosslink formation resulting from cure of the prepolymer to a thermoset structure.

What is claimed is:

1. Thermally curable prepolymers of the formula:

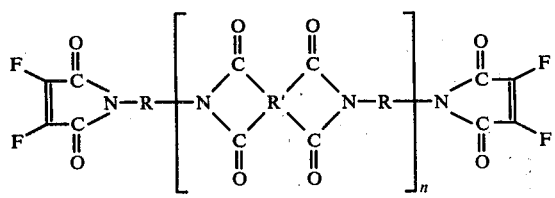

wherein n has a value from 0 to about 3, each R is independently an aromatic radical and R' is a tetra functional radical selected from the group consisting of:

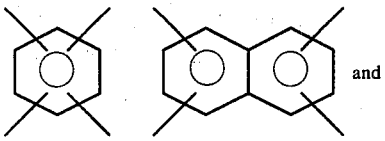

and

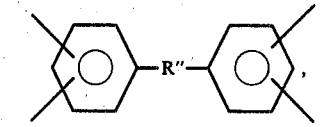

wherein R" is a difunctional radical selected from the group consisting of $-SO_2-$, $-O-$, $-S-$, $-CO-$,

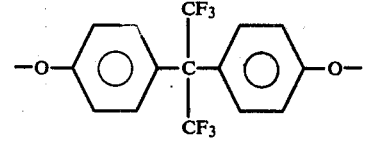

2. A thermally curable prepolymer as claimed in claim 1 in which R is a aromatic radical of an aromatic diamine selected from the group consisting of 4,4'-diamino-diphenyl methane, meta-phenylene diamine and bis-2,2,-[4-(4-aminophenoxy) phenyl] hexafluoropropane.

3. A thermally curable prepolymer as claimed in claim 1 in which R' is a radical of bis-2,2-[4-(3,4 dicarboxyphenoxy)phenyl]-hexafluoropropane dianhydride.

4. A thermally curable prepolymer as claimed in claim 2 in which R' is a radical of bis-2,2-[4-(3,4 dicarboxyphenoxy)phenyl]-hexafluoropropane dianhydride.

5. A thermally curable prepolymer of the formula:

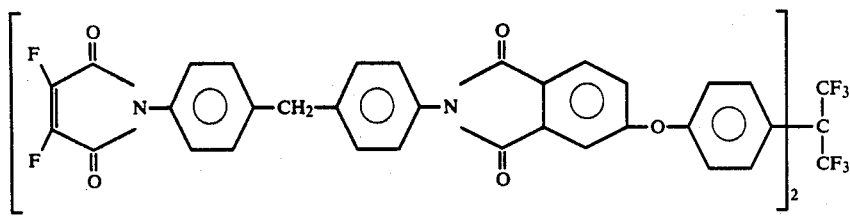
6. A thermally curable prepolymer of the formula:
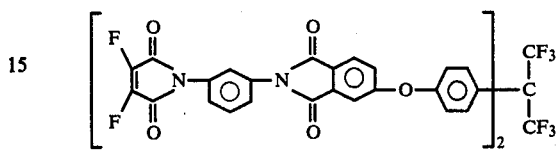
7. A thermally curable prepolymer of the formula:
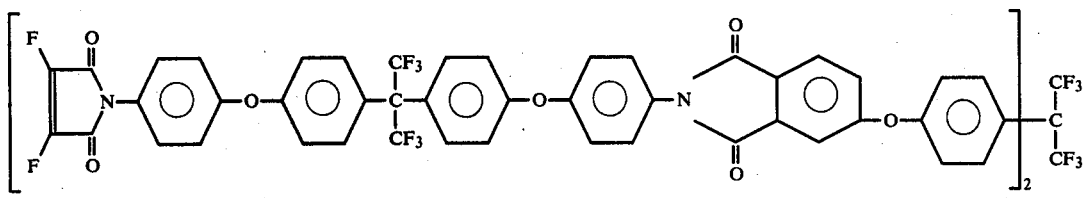
8. A polymer made by the step of thermally curing the prepolymer defined in claims 1, 2, 3, 4, 5, 6 or 7.
* * * * *